United States Patent Office 3,092,548
Patented June 4, 1963

3,092,548
METHOD OF TREATING PEPTIC ULCERS
WITH PANTOTHENIC ACID
Albert G. Worton, Columbus, Ohio, assignor to The
Warren-Teed Products Company, Columbus, Ohio, a
corporation of Ohio
No Drawing. Filed Oct. 27, 1960, Ser. No. 65,256
5 Claims. (Cl. 167—55)

This invention relates to preparation adapted for use in treating disorders of the gastro-intestinal tract, more particularly in treating peptic ulcer, both of the duodenal and gastric type, for hyperacidity, hypertropic gastritis, splenic flexure syndrome, biliary dyskinesia (postcholecystectomy syndrome) and hiatal hernia or other conditions where anticholinergic effect, either spasmolytic or antisecretory is indicated or where antiulcerogenic effect is indicated.

Physical and emotional stress are widely known to be one of the chief caustive factors of hypersecretion and hypermotility in the gastrointestinal tract. This leads ultimately to the formation of peptic ulcer in susceptible individuals, resulting fom failure of the gastro-duodenal mucosa to withstand the digestive action of the acidic gastric juice. Research has shown that the effects of local, systemic and emotional stress are similar and are independent of the specific nature of the damaging agent. Thus, surgical trauma, rage, fear, anxiety, emotional tension, frustration, personal conflict, physical exertion, burns, infections, etc. can cause the same type of response, namely, an alarm reaction in the organism which is believed to cause the increased utilization of corticoid hormones by the tissues and a consequent decrease in their blood level. This in turn is thought to cause a discharge of cortcotropin by the pituitary which stimulates the adrenals to secrete more corticoid hormones. However, before the adrenal response there is the above-described temporary condition of hypocorticism. The overwhelming stress along with the secondary adrenal insufficiency (termed the shock phase) may produce acute ulcers on the basis of shock accompanied by hypotension, hemoconcentration, vascular stasis, capillary fragility, leading to focal mucosal hemorrhages. This type of ulcer begins to heal as soon as the initial injury occurs.

The hypocortical situation comes to an end when the adrenals respond to the corticotropin and secrete additional corticoid hormone. However, in many cases the adrenals are overstimulated to produce a hypercortical condition (termed the counter-shock phase). This condition also results when large amounts of corticoid steriods are administered to the organism. This hypercorticism causes (1) an increase in gastric secretion of hydrochloric acid and pepsin in the gastro-intestinal tract and (2) an inhibition of fibroblast proliferation and delay of wound healing due to the inflammatory action.

As a result the acute ulcer formed in the shock phase becomes deeper, leading to hemorrhage or perforation or chronic peptic ulcer.

In the past several types of drug therapy have been devised for treatment and cure of peptic ulcer by one mechanism or another. One of the most encouraging has been treatment with an anticholinergic drug for the purpose of counteracting hypersecretion and hypermotility in the gastrointestinal tract.

The mechanism of action of anticholinergic drugs is through the inhibition of peripheral distribution of the parasympathetic (craniosacral autonomic) nerves intestinal vagus, as well as oculomotor, secretory, bronchial musculature, cardiac, uterus, etc.), resulting in blockade of gastric hypersecretions and intestinal spasticity.

The main troubles with the use of anticholinergic drugs are the various side effects that occur in an appreciable number of patients, the foremost of which are a blurring of vision, drowsiness and a general dry condition manifested by a retarded salivation, reduction of perspiration and diminished urinary output. Other side effects which occur in some cases are glaucoma, stimulation of the central nervous system and in severe cases cardiac and respiratory collapse. These side effects increase to some degree with the increase in dosage. Despite the side effects these compounds are fairly selective and highly effective in decreasing the volume and acidity of gastric secretion and in reducing gastrointestinal motility.

Understandably, the main problem in the past has been to provide a dosage of anticholinergic drug which will achieve the most beneficial results possible and yet minimize the undesired side effects. One of the objects of this invention is to provide novel compositions containing anticholinergics and methods of administering same which will be therapeutically effective even when providing low total dosages of the anticholinergic, thus minimizing undesirable side effects.

An outstanding example of this type of drug are the scopolamine lower-alkyl salts. A good description of these quaternary derivatives of scopolamine (l-hyoscine) may be found in U.S. Patent No. 2,753,288 to Visscher. They are lower alkyl in salts of the tropic acid ester of epoxytropine and may be represented by the following structural formula:

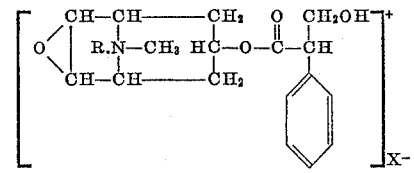

where R is a lower-alkyl group having not more than two carbon atoms and X is a member of the group consisting of a halogen having an atomic weight greater than nineteen, sulfate maleate, gluconate, tartrate, citrate, acetate, phosphate and nitrate.

Various antiulcerogenic preparations have been proposed to relieve gastroduodenal irritation and to effect a curative action on ulcerated conditions. Various proteins, fats and other nutrients have been used with some beneficial effects. Naturally occurring pantothenic acid is present in these nutrients in extremely small amounts. In addition, synthetically derived pantothenic acid has been added in very small amounts (vitamin-like quantities) along with much larger amounts of other vitamins such as A, D and the remaining B complexes.

Antacids preparations have long been used for temporary reduction of the hydrochloric acid content of the stomach and upper intestine.

While these various drugs have been helpful, they all have limitations and the need for other and superior drugs is apparent.

Though the presence of hydrochloric acid may be a contributing factor in the etiology of ulcers, factors other than hypersecretion, regardless of the cause, appear to be involved in the process. Diminished tissue resistance has been felt to be the primary, predisposing factor.

Even with the benefit of this knowledge, the cause of the diminished tissue resistance has not been satisfactorily explained. It was suggested as long as 20 years ago that the organism simply runs out of something needed to fight the damaging agent. It has been discovered that this something could be pantothenic acid.

It has been experimentally shown that depletion of pantothenic acid is a significant factor in the susceptibility to peptic ulcer.

It has further been determined that ulcer formation resulting from pantothenic acid deprivation can be prevented by removing either the adrenal cortex or the pituitary gland (the source of adrenal-stimulating ACTH). On the other hand, severe ulcers appear rapidly if cortisone is administered to the adrenalectomized or hypophysectomized, pantothenate deficient animal. This demonstrates that pantothenic acid deficiency and adrenocorticoid activity are factors in the etiology of ulcers, but it does not suggest that pantothenic acid would be effective in treating animal or human ulcers unless the ulcer cases were due to pantothenic acid deficiency. As yet, pantothenic acid deficiency in men has been observed only after experimental induction. However, no ulcers were observed as one of the symptoms.

Coenzyme A has been found to be essential in adrenal steriod synthesis and oxidative metabolism. For instance, when a subject is deprived of pantothenic acid (the metabolic source of coenzyme A), there is a significant decrease in gastric acid flow presumably due to a decrease in adrenal activity. Hence it is hypothesized that pantothenic acid deprivation delays and decreases adrenal function in response to stress to accentuate and prolong the initial hypocortical condition and thus sensitize the gastroduodenal mucosa to stress, the primary factor in the formation of active ulcers.

The focal mucosal hemorrhages and active ulcers caused in the gastroduodenal mucosa by stress are then vulnerable to the effects of adrenocortical hormone either internally generated or exogenously administered.

It is postulated that the stress factors previously mentioned increase the requirement of pantothenic acid through a greater demand for coenzyme A which is essential in adrenal steroid synthesis and oxidative metabolism. Thus the normally adequate supply of pantothenic acid becomes relatively inadequate and the gastrointestinal tract becomes sensitized as hereinbefore described.

As a well known B complex vitamin, pantothenic acid has heretofore been administered in what has been considered to be quantities adequate for general health needs. Minimum daily requirements have generally been considered to be around 10 milligrams per day. In addition, it has been included in amounts smaller than the minimum daily requirement, along with other vitamins and nutrients for treatment of gastric acidity. But the presence of the pantothenic acid has been more or less incidental to the nutritive support and in ineffectual, subtherapeutic quantities much smaller than the quantity considered to be the minimum daily requirement of pantothenic acid for general health requirements, under certain stressful conditions.

Little regard has been given in the past to the possibility of using pantothenic acid in substantial quantities directly in the treatment of gastric disorders in humans. In the past atonicity of intestinal muscle has been the chief indication for pantothenic acid to raise the acetylcholine level in the intestine (mediated through coenzyme A) to increase the motility of the gastrointestinal tract. Direct pantothenic acid treatment has been overlooked probably because of this since increased motility would tend to aggravate the sensitized condition of the ulcerated or inflamed duodenum. Hypermotility is itself a symptom of an inflamed or ulcerated condition and treatment with pantothenic acid would appear to aggravate the ulcerous condition to such an extent as to overshadow any possible beneficial results, particularly if the quantities used were very large. Manifestly, no one has determined the true potentialities of pantothenic acid in treatment of gastrointestinal disorders in man.

It has been discovered that nothwithstanding the normally supposed body requirements of pantothenic acid, administration of very large doses of pantothenic acid have been found to protect the human body, particularly the gastrointestinal tract, from certain well-defined effects of acute stress. In addition, larges doses of pantothenic acid (hereinafter called PA) are utilizable by the body and are extremely effective in treatment of the effects of gastric hyperacidity and peptic ulcer, which is called the stress disease. Contrary to the indications that PA would increase the symptoms of gastric disorders, it has been found not to cause hypermotility even when administered in extremely large doses. Accordingly, it is a principal object of this invention to provide methods and compositions for administering pantothenic acid in quantities and preparations effective for the treatment of gastro intestinal disorders.

It is an object of this invention to provide methods and compositions for administering PA in quantities effective as a preventative or treatment of gastric disorders in individuals experiencing ulcerogenic stimuli such as chronic anxiety states and other stress conditions to combat the increased susceptibility of the gastrointestinal mucosa to anxiety increased adrenal cortical secretions.

Many authorities have observed that corticosteroid treatment (for pulmonary diseases, etc.) increases the incidence of ulcers in humans. Also as previously indicated corticosteroids play a fundamental etiologic role in stress ulcer disease. Although PA treatment has been proposed for use in conjunction with corticosteroid treatment, it has been found that pantothenic acid has little or no effect in decreasing the incidence of ulcers during corticosteroid treatment.

It is a further object of this invention to provide a method of combined pantothenic acid and antacid treatment of gastric disorders and compositions for such treatment. In addition a nutritional support is provided with this combined treatment.

A further object of this invention is to provide a method of combined pantothenic acid and anticholinergic treatment and compositions for such treatment. Additionally, simultaneous treatment with pantothenic acid, plus an anticholinergic and an antacid, and compositions for such treatment, are provided according to this invention.

It has been found that pantothenic acid combined with an antacid such as calcium carbonate provides for more effective treatment of gastric disorders by the combination of the temporary reduction of acid in the gastrointestinal tract and the long range effect of the pantothenic acid for decreasing the sensitivity of the gastrointestinal lining, and building the PA concentration in the gastrointestinal area and increasing the PA concentration immediately available to the mucosa. Providing additional nutrients (defatted milk solids preferably) has been found to assist the repair and the buildup of the sensitized and injured areas.

It has been found that the combined treatment of gastrointestinal disorders with PA and an anticholinergic has been peculiarly effective. The side effects typical of most potent anticholinergic drugs are well known. Since the beneficial results increase wtih increased dosage, it is advantageous to obtain the most therapeutic results from these drugs with the least possible amount to minimize the undesirable side effects. Combined with PA treatment, anticholinergics have been found to be actively beneficial in amounts which are appreciably subtherapeutic when administered alone in treatment of gastric disorders.

There is evidence of synergistic action between the antiocholinergic and antiulcergenic PA. The primary action of the anticholinergic drug is to decrease hypersecretion and hypermotility in the gastrointestinal tract thus providing a better environment for healing of the mucosa. Thus pantothenic acid treatment of the gastrointestinal lining is facilitated and becomes more effective, particularly in severe cases of hypermotility where the PA complements the action of the anticholinergic by reducing the sensitivity of the gastro-duodenal mucosa to the effects of stress induced adrenocortical over-production. This result can be shown by comparisons made of administration of an anticholinergic concurrently with PA and mephobarbital (5-ethyl-1-methyl-5-phenylbarbituric acid.( general sedative) against like administration of the anticholinergic alone and anticholinergic with mephobarbital. The following table portrays these results:

RESPONSE TO TREATMENT OF DUODENAL ULCER PATIENTS

*Results in Patients Observed*

| Treatment | Results, percent | |
| --- | --- | --- |
| | Good | Fair |
| Methscopolamine Bromide alone (dosage 10-12.5 mg. daily)—60 patients | 36.7 | 63.3 |
| Methscopolamine Bromide with Mephobarbital (dosage 10-12.5 mg. and 120-150 mg. daily, respectively)—120 patients | 60.8 | 39.2 |
| Methscopolamine Nitrate with Mephobarbital and d-calcium Pantothenate (dosage 10-12.5 mg., 120-150 mg. and 100-125 mg. daily, respectively)—294 patients | 77.9 | 22.1 |

In a group of 302 peptic ulcer patients (294 included in the table), with an age range of 18 to 77 years and a ratio of males to females about 3 to 1, PA with mephobarbital and methscopolamine was administered. Eight of these patients were gastric ulcer patients and the remaining 294 had duodenal ulcers. Therapeutic respone in 7 of the 8 gastric ulcer patients was excellent with radiographic evidence of healing in 6 weeks. In the duodenal ulcer patients, gnawing discomfort and heartburn responded very satisfactorily, and none of the patients required surgery. In the controls with scopolamine methyl bromide alone and scopolamine methylbromide with barbiturate sedative, markedly less satisfactory results were obtained under the same conditions.

It is now known that atonicity and hypertonicity coexist in the same organ. This knowledge allows rationalization of the synergistic effect of adjunctive treatment with an anticholinergic compound and PA. As pointed out previously, one of the functions of PA is to increase the motility of the gastrointestinal region through coenzyme A. While the PA tends to increase the motility, the anticholinergic tends to decrease or prevent hypermotility of the organ. Thus, aside from the ulcer healing properties of PA the combination of these treatments would seem paradoxical but, because of these properties, PA and anticholinergic treatment are peculiarly suitable together. Furthermore, since atonicity and hypertonicity may coexist, the PA will be beneficial in insuring proper tone in the intestinal muscle while the anticholinergic acts to prevent symptomatic hypertonicity in the inflamed or ulcerated gastrointestinal tract.

PANTOTHENIC ACID

At the outset it should be made clear that the terms "pantothenic acid" referred to in the general discussion and "calcium pantothenate" referred to elsewhere are used merely for the sake of convenience. As is clear to one skilled in the art any bound or unbound form of pantothenic acid or any other assimilable pantothenyl group containing compound is suitable in the practice of this invention, for example, calcium potassium, and sodium pantothenate, d-pantothenyl alcohol, coenzyme A or intermediates thereof and pantothenic acid are equally applicable. Furthermore, all of the pantothenyl compounds referred to are the dextro-rotatory isomers or derivatives thereof. Manifestly, racemic mixtures of the dextro-rotatory and levo-rotatory isomers, although optically inactive, may also be used in this invention. Since the physiologic activity of a racemic mixture is only about one half that of the pure dextro-rotatory form, the racemic mixtures are to be used in doses twice those indicated for the pure dextro-rotatory isomers. It should be understood that whenever a certain quantity or amount of a pantothenyl compound is referred to, the dextro-rotatory form is indicated and the equivalent of the other bound or unbound forms of pantothenyl compound are equally applicable when a certain weight of a particular form of dextrorotatory pantothenyl compound is referred to.

According to this invention, dosages of pantothenyl compound in the preferred form of calcium pantothenate are administered orally or intravenously or otherwise parenterally in treatment of gastric disorders of the type mentioned in dosages of 10 mg. per day or greater. There is practically no upper limit on the dosage. As much as 8 grams of calcium pantothenate per day has been given to human subjects as long as 6 weeks without any sign of harmful side effects. Experience has shown that a dosage from 100 mg. to 400 mg. per day is the most beneficial treatment commensurate with the quantities of the drug required for most cases. This is the preferred dosage although appreciably increased beneficial results in combating stress have been found with dosages as high as 8 grams per day. But, economically, the amount of increased protection from stress does not warrant the great increase in dosage in the general case. However, extremely high dosages do become important in more critical cases and are therefore a significant part of this invention. For example, in post-operative treatment of surgical trauma, a unit dose of 500 mg. of d-calcium pantothenate given once every 6 hours is recommended. This amounts to a daily dosage of 2000 mg.

Although the daily dosage of calcium pantothenate itself may be given at one time, it is preferred to use the usual method of administration when given orally, i.e. 3 or 4 times a day after each meal and at bedtime.

The minimum unit dosage is not incommensurate with the daily dosage vitamin supplements administered for general health needs. While this amount is beneficial in a few cases or near the end of a course of treatment, the majority of cases are found to require dosages which are massive in comparison with normal vitamin supplement administration.

It is to be emphasized that administration of pantothenic acid for gastric disorder treatment according to this invention is to produce not only a healing effect but also a preventative effect. Thus in persons subjected to ulcerogenic stimuli caused by stress conditions such as surgical trauma in pregnancy, whether or not manifested as yet in the usual symptoms of hypersecretion, hypermotility, inflammation or ulceration, a high daily dosage of pantothenic acid is required for adequate relief and healing and rehabilitation of the gastrointestinal mucosa.

Where inflammation or ulceration is already present and in patients experiencing very serious stress conditions such as occur for example during severe emotional tension or chronic anxiety, at least the normal daily dosage of from 100 mg. to 500 mg. is advisable, particularly if appreciable inflammation and hypermotility or if any ulceration has occurred.

PANTOTHENIC ACID-ANTACID

Since an antacid functions to relieve gastrointestinal disorders in a manner different from that of PA, the temporary relief afforded by administering an antacid along with PA has been found to be helpful in increasing the effectiveness of treatment with PA. Accordingly, it has been found desirable to administer an effective antacid along with the PA treatments in accordance with this invention. Preferably, the antacid is incorporated in a mixture with the PA in the form of a powder, tablet or liquid for convenient administration thereof.

It is preferable to use calcium carbonate, a well known antacid, in an hourly dosage of from 500 mg. to 6 grams. The exact amount is not critical but any smaller dosage is only partially therapeutically effective. In accordance with this invention, defatted dispersible milk solids may be added to the compositions, thus providing an additional nutrient support for rehabilitation of the gastrointestinal lining. The milk solids contain large amounts of milk proteins, principal of which are casein and lactalbumin which are particularly effective for this purpose in concentrated solid form. In addition, the milk solids augment the antacid action of calcium carbonate by consuming excess hydrochloric acid that has not been neutralized by the calcium carbonate.

Other antacids besides calcium carbonate are also effective with pantothenic acid. Among these are magnesium trisilicate, magnesium carbonate, aluminum hydroxide gel, magnesium oxide, magnesium hydroxide, aminoacetic acid (glycine), dihydroxy aluminum aminoacetate, calcium caseinate, alkali metal bicarbonates, monocalcium phosphate, sodium carboxymethylcellulose, aluminum phosphate gel, bismuth subcarbonate, disodium phosphate, tricalcium phosphate, gastric mucin, non-toxic anion exchange resins, and the like. These antacids may be used alone or in combination. Various other vegetable or animal protein or fat may also be used as additional nutrient support.

PANTOTHENIC ACID ANTICHOLINERGIC ADMINSTRATION AND COMPOUNDS

While anticholinergics have been utilized with various sedatives, suppressants, antiacids and the like, for treatment of gastric disorders, little thought has been given to the idea of combining this type of treatment with a more direct antiulcerogenic treatment. Some mention has been made of combining anticholinergic with an antiproteolytic agent such as protamine sulfate and soybean trypsin inhibitors but it is still a matter of speculation whether simultaneous treatment with these agents actually is therapeutically effective. Little light is shed upon this question by the results now experienced with PA since there is no logical correlation between the function of these inhibitors and that of pantothenic acid.

It has been found that pantothenic acid cooperates very effectively with an anticholinergic agent for relief and cure of gastric disorders. By combining these treatments as taught by this application, not only equal but significantly better results are obtained by using a smaller dosage of anticholinergic with pantothenic acid than a larger dosage of the same anticholinergic alone. For example, it has been found that a formulation of 2.0 mg. scopolamine methylbromide with 25 mg. of calcium pantothenate as a single dose is therapeutically effective, whereas a scopolamine methylbromide dosage below 2.5 mg. alone or administered along with antacids, suppressants, sedatives or nutrient support is subtherapeutic and of no practical value in obtaining healing of the ulcer crater. While PA and the anticholinergic agents cooperate synergistically to achieve this result, the exact mechanism of cooperation is not yet fully understood. It is clear, however, that by this combined treatment, the beneficial effects of the anticholinergic can be obtained with minimum side effects which become increasingly greater with increased dosages of anticholinergic.

Any anticholinergic or antispasmodic agent, either natural or synthetic can be employed beneficially with PA in the above manner. It is preferred to use scopolamine and its derivatives which include all of the lower alkyl halides, nitrates, sulphates, maleates, gluconates, tartrates, citrates, acetates, and phosphates. All other forms of anticholinergic alkanoids and their derivatives obtainable from belladonna and related plants such as hyoscyamus and stramonium are also useful. Other anticholinergic agents that can be employed include ambutanium bromide, aminopentamide sulfate, dibutoline sulfate, dicyclomine hydrochloride, procyclidine hydrochloride, tricyclamol chloride, tridihexethyl iodide and/or chloride, oxyphencyclimine hydrochloride, isopropamide iodide, mepenzolate methylbromide, valethamate bromide, oxyphenonium bromide and their derivatives or analogs.

The anticholinergic dosage (and thereby the proportion of anticholinergic in the compositions prepared according to this invention) that is to be administered along with PA can be as large as the amount that can be administered alone. For anticholinergics, this is usually governed by the seriousness of the side effects as the dosage level rises since even at very high levels the anticholinergics are effective in relieving hypersecretion and hypermotility.

The minimum quantity of anticholinergic, on the other hand, is not governed by what has in the past considered to be the minimum therapeutically effective amount either for a unit dose or a daily dosage. For instance, it has been found that a dosage as low as 0.5 mg. of scopolamine lower-alkyl halides or nitrate, wherein the lower-alkyl group contains not more than two carbon atoms and the halogens has an atomic weight greater than 19, has been found to be an effective therpeutical unit dose when administered alone with at least 10 mg. of d-calcium pantothenate. The preferred unit dosage is 2.5 mg. of the scopolamine salts and 25 mg. of d-calcium pantothenate.

Under the same considerations, the daily dosage may vary from 1 to 50 mg. of the scopolamine salts along with at least 10 mg. of d-calcium pantothenate.

In the case of most of the scopolamine salts, the molecular weights do not vary to a great extent so equal amounts of each salt contain approximately the same amount of the base. The ranges above are based on methscopolamine nitrate to adjustment can be made for the equivalent amounts of salts having considerably larger molecular weights such as the gluconates, tartrates, citrates, etc.

In the case of propantheline bromide the unit dosage may range from 5 mg. to 60 mg. when administered with at least 10 mg. of d-calcium pantothenate and a daily dosage may vary from 50 mg. to 300 mg. In a like manner, the unit dosage range for methantheline bromide may vary from 10 mg. to 150 mg. and the daily dosage from 40 mg. to 800 mg. when administered with at least 10 mg. d-calcium pantothenate.

For most effective and lasting results, treatment should be extended over a long period of time with daily dosages in therapeutically beneficial amounts. It is apparent that a single dose must be small enough to avoid severe side effects but beyond this it is advantageous to administer the desired daily dosage in a series of periodic unit doses for more sustained anticholinergic and antiulcerogenic action.

In the treatment of gastrointestinal spasticity, a large initial total daily dosage is recommended, even as much as 50 mg. of methscopolamine nitrate if tolerated adequately. This dosage may be substantially reduced after a few days when the patient has responded favorably to the treatment. As a unit dose, 20 mg. of methscopolamine is about the largest amount which can be tolerated and 0.5 mg. is about the minimum effective amount if given orally. The largest parenteral unit dose that can be tolerated is about 2.5 mg. but the preferred dose is 0.5 mg. of methscopolamine nitrate in suitable solution (1 mg. per cc. of solution). In any case if severe side effects appear, therapy should be temporarily discontinued and then resumed at a lower dose level. The adjunctive treatment with PA does not increase any side effects experienced with the anticholinergic.

The proportion of anticholinergic to PA administered is not of critical importance within the therapeutical ranges. Around 25 mg. of calcium pantothenate per unit dose and corresponding daily dosage of 125 mg. at the present time appears to be the optimum for general treatment. However, this amount may be increased greatly with increased beneficial results in many cases and the daily dosage may be as high as 8 grams.

The chief consideration for dosage of the anticholinergic is the severity of the side effects weighed against the increase in therapeutic effectiveness. In a typical example, it has been found that a unit dose of 2.5 mg. of these scopolamine alkyl salts mentioned above along with 25 mg. of d-calcium pantothenate is the optimum for general treatment under these considerations. However, there are certain individual who are unusually sensitive to drugs and for these patients the unit dose of 1.0 mg. of scopolamine lower alkyl salts and accordingly, the daily dosage would be altered in proportion to the change in the unit dose.

It has also been found effective to include a concurrent treatment with an antacid in a manner analogous to that described above for PA antacid treatment. The corresponding dosages of antacid are applicable for PA anticholinergic treatment.

OTHER TREATMENT

All of the treatments according to this invention may be supplemented by other treatments thought to be necessary or helpful. For instance anti-hemorrhagic and coagulant preparations such as n-butyl alcohol, thrombin, gelatin, vitamin K, carboxymethylcellulose, methylcellulose or the like may be used in the acute hemorrhagic stage of gastrointestinal ulcer and may be combined in composition with PA, anticholinergic and antacid.

Local anesthetic effective in the gastrointestinal tract such as procaine hydrochloride, benzocaine, benzonatate or the like may be similarly employed.

Digestive enzymes, especially trypsin and chymotrypsin, administered orally as an adjunctive treatment to PA administered according to this invention are found to be helpful in treatment of peptic ulcer.

Cellulose digesting enzymes, such as cellulase, may be administered to reduce irritative stress in the digestive tract caused by cellulose or roughage particularly in conditions such as ulcerative colitis or spastic colitis. These enzymes do not occur naturally in humans at least not in the quantities found in cellulose digesting organisms. They work very effectively in cooperation with anticholinergic and PA treatment.

Since ulcer patients usually have a nervous condition, general sedatives have been found to be useful as adjunctive treatment. These include the barbituric acid derivatives such as allyliso-propylbarbituric acid, isoamylethylbarbituric acid, diethylbarbituric acid, diallylbarbituric acid, calcium ethylisopropylbarbiturate, n-butylethylbarbituric acid, isopropyl bromallyl barbituric acid, sodium n-hexylethylbarbiturate, sodium ethyl (1-methylbutyl) barbiturate, 1-methylpropyl-B-bromallyl barbituric acid, phenylethylbarbituric acid, cyclohexenylethyl barbituric acid, isobutylallyl barbituric acid, sodium allyl (1-methylbutyl)-barbiturate, and the like. Nonbarbiturates such as 3-O-tolyl-4(3H)-quinazolone hydrochloride, phenothiazine tranquilizers or so-called psychic energizers, meprobamate and its derivatives or analogs, other central sympathetic suppressants, including rauwolfia alkaloids and their synthesized derivatives or analogs may also be used in this manner. These drugs may be administered independently or may be compounded with pantothenic acid, anticholinergic and antacid.

COMPOSITIONS

Pantothenate salts may be administered orally in pure crystalline powder form or compressed into tablets by the addition of a small amount of lubricating agent such as starch and calcium stearate. Pantothenic acid and pantothenyl alcohol (dexpanthenol), being viscous liquids are more readily adaptable to parenteral administration although they may be given satisfactorily by the oral route after dilution with a diluent such as water or alcohol. Parenteral administration of any of the forms is possible (after addition of an appropriate substance such as sodium chloride or glucose if necessary to render to solution substantially isotonic with blood). The oral route is preferred due to the greatly increased ease and safety of administration and the increased effectivenes of the pantothenic acid when concentrated directly on the mucus lining of the stomach and duodenum. The parenteral route is appropriate where the patient is unable to take the drug orally such as in severe cases of ulceration.

Pantothenic acid is the least preferred form due to heat and air instability problems. Although usable both orally and parenterally the PA in solution must be maintained between pH 3 and 5 and the substance must be kept at a low temperature and sealed from the atmosphere in order to maintain its effectiveness over any long period of time.

The metal salts of PA in powder form are the most preferred form for compounding with antacid, anticholinergic and other active agents. Diluents or carriers may be used or desired or as far as required for the other active ingredients besides the pantothenate salt. Diluents are generally not needed due to the comparatively large amount of pantothenate salt in the compositions prepared for treatment in accordance with this invention. This problem arises only with a few anticholinergics such as some of the scopolamine anticholinergics. But it can easily be shown with reference to the scopolamine lower alkyl salts administered along with calcium pantothenate in the manner previously described that even in a unit dose containing only 10 mg. calcium pantothenate and a maximum amount of scopolamine salt (20 mg.), the scopolamine salt is only 67% of the corresponding composition. On the other hand, diluents and carriers may be desirable to make the composition more palatable or easy to handle, particularly when in a powder form.

At the other extreme, PA must be present in the compositions in sufficient quantities to make it practical for oral or parenteral administration. For oral administration 0.5% by weight of calcium pantothenate is convenient for assimilation by drinking (dissolving a powdered composition in water or milk) or by swallowing in tablet or capsule form. Below a concentration of 0.01% of calcium pantothenate, the quantity of composition required to be administered in order to obtain the therapeutic dose is prohibitive.

For parenteral administration similar considerations prevail to limit the volume of fluid in which a therapeutic dose is present.

It may be desirable to prepare the compositions in the form of a laminated tablet to obtain more prolonged or delayed action. The enteric coating serves to resist disintegration of the tablet or the pill in the acid juice of the stomach and permits some of the active ingredients to pass intact into the duodenum thus having a more delayed action. This form is particularly useful for combined treatment with PA, and anti-cholinergic and an antacid. For example, a tablet containing a composition of anticholinergic and PA may be uniformly coated with a sufficient amount of enteric material to permit the tablet to pass into the duodenum before dissolving and to give a delayed action. To give double action, this pill may be in turn coated with a composition containing antacid, anticholinergic and PA to obtain immediate and prolonged activity by dissolving in the stomach. To give selective, immediate action, this pill or tablet may carry any one or all, or a part of any one or all, of these ingredients in its outer coating. The enteric coating may be made from a large variety of substances including casein, stearic acid, carboxymethyl cellulose or shellacammonia and the like.

A preferred form of PA antacid composition is a powder containing 25 mg. de-calcium pantothenate and 350 mg. calcium carbonate in 4.625 grams of defatted dispersible milk solids. In this form, the preferred dosage (25–50 mg. of calcium pantothenate) is contained in 1 or 2 level tablespoonfuls of powder. This powder is mixed with a half glass of water and taken before meals and at bed time, or as directed by the physician. The solution is quite palatable and has a pleasing eggnog flavor. If desirable, other ingredients may be added to impart a different flavor or taste. Alternatively the powder may be encapsulated in a gelatin capsule or the like to be swallowed whole. The preferred PA anticholinergic is a tablet comprising 2.5 mg. methscopolamine nitrate, 25 mg. de-calcium pantothenate and 30 mg. of mephobarbital. The appropriate dosage is one tablet with each meal and two at bedtime.

It has been found quite useful to combine the above PA antacid and PA anticholinergic treatments or to supplement the PA anticholinergic treatment with intermittent PA antacid treatment, or vice versa.

*Example I*

For 5000 milligrams yield of PA antacid, intimately mixed as fine powders the following:

| | Milligrams |
|---|---|
| d-Calcium pantothenate | 25 |
| Defatted dispersable milk solids | 4625 |
| Calcium carbonate | 350 |

The product combines with 200 cc. of N/20 hydrochloric acid in 30 minutes at 37 degrees C. using bromphenol blue as the indicator. The adult dose recommended, 1 to 2 tablespoonfuls, is mixed with ½ glass of water for oral administration.

In the manner shown in Example I, numerous other oral dosages of compositions of the present invention have also been prepared. Extended clinical trials have been conducted by disinterested physicians.

In one test the powder as prepared in Example I was evaluated by its exclusive use in the management of heart burn in 20 patients in the 3rd trimester of pregnancy by dosages of 1 or 2 tablespoonfuls of powder at each meal and at bedtime. Adequate control was reported in 17 of the 20 patients. In another test, 22 heartburn patients were so treated and all responded satisfactorily, however, a few patients required an antispasmodic for complete control of heartburn. Some immediate response followed by gradual improvement over periods in excess of a week were noted in most cases.

Another evaluation reported the PA antacid of Example I to have proven to be of definite value where former antacids had failed or were poorly tolerated. The PA antacid was employed in the management of hyperacidity, gastritis and duodenal ulcers in 18 patients with satisfactory results in 16 of the 18 patients treated. There were no untoward effects in any of the patients from the use of this composition. The patients were both male and female and the great majority of female patients were nonpregnant. A high patient acceptancy of the composition was noted. The three duodenal ulcer patients in the group obtained satisfactory healing. The tests were conducted over a period of 6 weeks.

In a test on 16 males and nonpregnant females in the management of hyperacidity and gastritis, satisfactory relief in 15 of the 16 patients was observed when treated according to Example I.

*Example II*

For a 70.308 kg. batch of tablets, prepare a dry blend in a pony mixer of the following:

| | Kg. |
|---|---|
| Lactose, U.S.P | 14.317 |
| Corn starch, U.S.P | 16.119 |
| Mephobarbital, N.F | 18.600 |
| Calcium pantothenate, U.S.P | 16.275 |
| Methscopolamine nitrate | 1.550 |

Pass this dry blend through a Fitzpatrick comminuting machine using a number 60 screen. Granulate the dry blend with the following paste mixture in the Stokes blender until the color is homogeneous. Prepare the paste mixture as follows: Dissolve 0.0534 kg. of cert. sugar orange in 0.928 liter of distilled water and mix thoroughly with 6.300 kg. of starch paste and 0.186 kg. of calcium stearate.

Next, pass the granulation through a Colton wet granulator using a 2A sieve at medium speed. Then add and mix thoroughly the following:

| | Kg. |
|---|---|
| Calcium stearate | 0.186 |
| Jaquar A20B | 0.742 |
| Micro Cel, C-1 | 0.186 |

Compress at 4 lbs. in a tablet machine using a ¼ inch shallow concave punch and adjust tablet thickness to 0.035 inch to produce a tablet weighing 0.1134 gm.

Prepared in this manner each tablet contains the following:

| | Mg. |
|---|---|
| Mephobarbital | 30 |
| d-Calcium pantothenate | 25 |
| Methscopolamine nitrate | 2.5 |

Recommended dosage for adults is one tablet with each meal and two at bedtime.

Under double blind conditions in the treatment of splenic flexure syndrome, biliary dyskinesia and unclassified gaseous distention 89 patients were treated in the recommended manner and observed during treatment and during a follow-up period by X-ray studies or clinical evaluation. The patients were given an initial dosage of 1 or 2 tablets before meals and at bedtime for a period of 2 to 4 days and then dropped to a maintenance dosage of 1 to 3 tablets daily, depending upon the patient's symptoms.

A course of therapy varying from 3 to 6 weeks in most cases resulted in subsidence in the findings and syptomatology for periods as long as 6 months and as short a time as 2 months. Upon return of the symptoms a repeat course of the same medication was satisfactorily instituted. The medication was successful in achieving these results in 90% of the cases.

A few patients, mainly those with biliary dyskinesia and splenic flexure syndrome, were placed on intermittent use of the tablets as needed, taking them only two or three times a week. Adequate relief has resulted for over a year in most cases.

Twenty-one of the patients suffered from splenic flexure syndrome. Of these 19 obtained a good response, 1 had no response and 1 a fair response. On 45 biliary dyskinesia patients, 32 had a good response, 11 a fair response and 2 no response. In treatment of unclassified cases of gaseous distention in 16 patients, 14 showed good response while the other 2 showed fair response.

A four year evaluation was made of treatment of 294 duodenal ulcer patients and 8 gastric ulcer patients using the recommended dosage. The ages in the group varied from 18 to 77 years and the ratio of males to females was about 3 to 1. Therapeutic response in 7 of the 8 gastric ulcer patients was excellent with radiographic evidence of healing in six weeks. In the eighth patient the lesion proved to be malignant and surgery was required. Duodenal ulceration with gnawing discomfort and heartburn responded very satisfactorily showing good results in 77.9% of the patients and fair results in the remaining 22.1%. None of the duodenal patients required surgery. In all cases the diagnosis and subsequent progress of each patient was radiographically assessed.

It was found that in the "fair progress' group results could usually be improved by adjunctive administration of the antacid PA composition described in Example I and with supplementary treatment with other potent antacids. Adjunctive antacid treatment was found helpful in all cases including those in which quick response was observed.

A greater therapeutic effect was observed with this medication than with any anticholinergic drug formerly used. Even controls of methscopolamine nitrate alone and methscopolamine nitrate with mephobarbital were found markedly less effective.

This was the only anticholinergic drug that the patients tolerated well over periods of years. Approximately fifty of the patients were treated continuously for three years without any ill effects. This has not been true with any other anticholinergic drug.

Clinical evaluation indicated that there were few side effects such as dryness of the mouth, blurring of vision or urinary retention. Drowsiness was complained of occasionally but this was generally eliminated by leaving out the noon dose.

The discomfort of hiatal hernia was relieved in 18 patients by the recommended dosage for periods up to four months, with good palliative results in 14 and fair results in 4, so long as the patients were on the medication.

*Example III*

In the manner of Example II many other PA anticholinergic compositions have been prepared and tested. These include the following recommended compositions which are also effective in treatment with doses as per Example II:

A tablet containing:
  Methscopolamine bromide_____ 2.0
  Mephobarbital _____ 30.0
  d-Calcium pantothenate_____ 25.0
A powder containing in each 5 grams:
  Methscopolamine bromide_____ 2.5
  d-Calcium pantothenate_____ 25.0
  Calcium carbonate_____ 350
A powder containing in each 5 grams:
  Methscopolamine nitrate_____ 2.5
  d-Calcium pantothenate_____ 25.0
  Calcium carbonate_____ 350.0
A tablet containing:
  Methantheline bromide_____ 50.0
  d-Calcium pantothenate_____ 25.0
A tablet containing:
  Propantheline bromide_____ 15.0
  d-Calcium pantothenate_____ 25.0

While the invention has been described in connection with different embodiments thereof, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. The method of treating gastrointestinal peptic inflammation and ulceration in humans which comprises administering to a person suffering therefrom at least 20 mg. per day of a non-toxic, dextrorotatory pantothenyl group containing compound selected from the group consisting of: pantothenyl alcohol, d-pantothenic acid, and non-toxic metal salts of d-pantothenic acid.

2. A method as in claim 1 which includes adjunctively orally administering to said person a therapeutic amount of antacid as required for temporary relief of hyperacidity.

3. A method as in claim 1 and including adjunctively administering to said person an anticholinergic drug.

4. A method as in claim 1 and including adjunctively orally administering to said person a general sedative, thereby reducing the effects of emotional stress on the gastrointestinal tract.

5. The method of treating gastrointestinal peptic inflammation and ulceration in humans which comprises administering to a person suffering therefrom at least 20 mg. per day of calcium pantothenate.

References Cited in the file of this patent

UNITED STATES PATENTS 2,638,433   George _____ May 12, 1953
2,868,693   Shive et al. _____ Jan. 13, 1959

OTHER REFERENCES

Physicians' Desk Reference (P.D.R.), 12th ed., 1958, pages 704 and 705.

Blake: Clinical Medicine 5:6, pages 773–776, June 1958.

Donnazyme, J.A.P.A./Practical Pharmacy Ed., vol. 20, No. 4, April 1959, page 181.

Sci. News Ltr., 71:20, May 18, 1957, "Rats Get Ulcers Over Too Little B Vitamins," p. 312.

Treskunor et al.: "Treatment of Peptic Ulcer With Pantothenic Acid," Klinicheskaya Meditsina, vol. 38, pp. 146–8, August 1960 (Rus.).

Wissmer: "The Treatment of Gastric Ulcer With Pantothenic Acid," Gastroenterologia (Basel), vol. 94, pages 366–79 (1960), in French.